(12) United States Patent
Sakamoto et al.

(10) Patent No.: US 9,956,829 B2
(45) Date of Patent: May 1, 2018

(54) PNEUMATIC TIRE

(71) Applicant: Sumitomo Rubber Industries, Ltd., Kobe-shi, Hyogo (JP)

(72) Inventors: Masayuki Sakamoto, Kobe (JP); Kenji Ueda, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 610 days.

(21) Appl. No.: 14/613,036

(22) Filed: Feb. 3, 2015

(65) Prior Publication Data

US 2015/0239299 A1    Aug. 27, 2015

(30) Foreign Application Priority Data

Feb. 25, 2014    (JP) .................... 2014-034461

(51) Int. Cl.
*B60C 15/00*    (2006.01)
*B60C 15/04*    (2006.01)

(52) U.S. Cl.
CPC ........ *B60C 15/04* (2013.01); *B60C 2015/046* (2013.01); *B60C 2015/048* (2013.01)

(58) Field of Classification Search
CPC ............ B60C 15/04; B60C 2015/046; B60C 2015/048
See application file for complete search history.

(56) References Cited

U.S. PATENT DOCUMENTS 5,511,600 A * 4/1996 Glotzbach ............ B60C 15/04
152/540
5,529,106 A * 6/1996 Yamamoto ........... B60C 15/04
152/540

FOREIGN PATENT DOCUMENTS

| DE | 197 06 262 A1 | 8/1997 |
| JP | 2001-55022 A | 2/2001 |
| JP | 2002-19429 A | 1/2002 |
| JP | 2004-82767 A | 3/2004 |
| JP | 2013-141919 A | 7/2013 |

OTHER PUBLICATIONS

JPO machine translation of JP 2001-055022, Sep. 2, 2017.*
JPO machine translation of JP 2002-019429, retrieved Dec. 28, 2017.*
Extended European Search Report, dated Jul. 24, 2015, for European Application No. 15151267.0.

* cited by examiner

*Primary Examiner* — Timothy Kennedy

(74) *Attorney, Agent, or Firm* — Birch, Stewart, Kolasch & Birch, LLP

(57) ABSTRACT

A pneumatic tire 1 is provided in a bead portion 4 with a bead core 5 formed of a bead wire 20. The bead core 5 has a wound single bead wire structure formed from turns of the single bead wire 20, and has at least three wire layers 10. Each side face of the bead core 5 has a shape such that it is possible to draw a common tangent 30 to at least two turns of the bead wire 20 appearing in the side face 51 which common tangent is substantially parallel with the tire radial direction. The turns of the bead wire 21 in the 1st wire layer 11 are alternated with the turns of the bead wire 22 in the 2nd wire layer 12 disposed on the outside of the 1st wire layer 11. The 1st wire layer 11 includes a turn 21 having the winding-start end 16 of the bead wire, which turn 21 is positioned between adjacent two turns 22 of the bead wire in the 2nd wire layer 12.

5 Claims, 7 Drawing Sheets

US 9,956,829 B2

PNEUMATIC TIRE

TECHNICAL FIELD

The present invention relates to a pneumatic tire improved in uniformity and durability of the bead portions.

BACKGROUND ART

In the following patent document 1, there is proposed a pneumatic tire in which a bead core has a wound single bead wire structure and the bead wire has a winding-stop end disposed between the bead core and a bead apex rubber.

In such bead core, spring back of the winding-stop end is suppressed. Thereby, damage of the bead core starting from the winding-stop end is prevented. Consequently, the durability of the bead portion is improved.

PRIOR ART DOCUMENT

Patent Document

[Patent document 1] Japanese Patent Application Publication NO. 2013-141919

However, the tire of the patent document 1 has room for improvement in the uniformity and the durability of the bead portions.

SUMMARY OF INVENTION

Technical Problem

The present invention was made with the view to the above-mentioned actual circumstances, and a primary object is to provide a pneumatic tire in which the uniformity and the durability of the bead portion are improved by improving the above-mentioned shape of the side face of the bead core and the wire layer arrangement.

Solution to Problem

The present invention is a pneumatic tire provided in a bead portion with a bead core constructed by a steel bead wire, and characterized in that the bead core has a wound single bead wire structure in which a single bead wire is continuously wound around the tire rotational axis so as to have a winding-start end and a winding-stop end, in a tire meridian section including the tire rotational axis, the wound single bead wire structure has at least three wire layers in the tire radial direction, of turns of the bead wire which are arrange side by side in the tire axial direction, and each side face of the bead core has a shape such that it is possible to draw a common tangent to at least two turns of the bead wire appearing in the side face which common tangent is substantially parallel to the tire radial direction, turns of the bead wire in the 1st wire layer which is innermost in the tire radial direction are alternated with turns of the bead wire in the 2nd wire layer which is disposed on the outside of the 1st wire layer in the tire radial direction so that the wire's centers of the turns are shifted from each other in the tire axial direction by a substantially wire's radius, and the 1st wire layer has the winding-start end of the bead wire, and the winding-start end is positioned between adjacent two turns of the bead wire in the 2nd wire layer.

In the pneumatic tire according to the present invention, it is preferable that the turns of the bead wire in the 1st wire layer are alternated with the turns of the bead wire in the 2nd wire layer so that the wire's centers of the turns are shifted from each other in the tire axial direction by a substantially wire's radius over the substantially entire circumference.

In the pneumatic tire according to the present invention, it is preferable that the turn having the winding-start end is axially outermost in the turns of the 1st wire layer.

In the pneumatic tire according to the present invention, it is preferable that the above-mentioned at least three wire layers include a 4th wire layer which is disposed on the radially outside of the 3rd wire layer which is disposed on the radially outside of the 2nd wire layer, and turns of the bead wire in the 3rd wire layer and turns of the bead wire in the 4th wire layer are respectively disposed at the substantially same axial positions as those of the turns of the 2nd wire layer.

In the pneumatic tire according to the present invention, it is preferable that the above-mentioned at least three wire layers include a 4th wire layer which is disposed on the radially outside of the 3rd wire layer which is disposed on the radially outside of the 2nd wire layer, the turns of the bead wire in the 2nd wire layer are alternated with turns of the bead wire in the 3rd wire layer so that the wire's centers of the turns are shifted from each other in the tire axial direction by a substantially wire's radius, and the turns of the bead wire in the 3rd wire layer are alternated with turns of the bead wire in the 4th wire layer so that the wire's centers of the turns are shifted from each other in the tire axial direction by a substantially wire's radius.

In the pneumatic tire according to the present invention, it is preferable that the number of the turns of the bead wire in the 2nd wire layer and the number of the turns of the bead wire in the 4th wire layer are larger by one (1) than the number of the turns of the bead wire in the 3rd wire layer.

Advantageous Effects of Invention

The pneumatic tire according to the present invention is provided in the bead portion with the bead core constructed by the steel bead wire. The bead core is of a wound single bead wire structure formed by continuously winding the single bead wire around the tire rotational axis so as to have the winding-start end and the winding-stop end.

The bead core according to the present invention has at least three wire layers in the tire radial direction, of the turns of the bead wire arranged side by side in the tire axial direction. Each of the side faces of the bead core has a shape such that a common tangent which is substantially parallel to the tire radial direction can be drawn to at least two turns of the bead wire appearing in the side face.

In general, when forming and shaping a raw tire, a bead core is handled with its both side faces pinched by a jig. Since the bead core according to the present invention has the side faces having the above-mentioned shape, it can be stably pinched by a jig. Further, in each side face of the bead core, a pressing force from a jig is dispersedly imposed on a plurality of the turns of the bead wire, and possible disarrangement of the turns of the bead wire is effectively prevented. Therefore, the bead core according to the present invention can improve the tire uniformity.

In addition, the above-mentioned shape of the side face increases the contact area with a carcass ply folded at the bead core. Consequently, damage of the carcass ply due to friction by the bead core is effectively prevented.

The turns of the bead wire of the radially innermost 1st wire layer are alternated with the turns of the bead wire in the 2nd wire layer disposed on the radially outside of the 1st wire layer so that the wire's centers are shifted from each other in the tire axial direction by a substantially wire's radius. Thereby, if the bead portion is deformed during running, the 1st wire layer and the 2nd wire layer are prevented from being displaced because the turns of the bead wire in the 1st wire layer are engaged with those in the 2nd wire layer.

Since the turn having the winding-start end in the 1st wire layer is positioned between adjacent two turns of the bead wire in the 2nd wire layer, the position of the winding-start end becomes stable, and the durability of the bead portion is well maintained.

As described above, the pneumatic tire according to the present invention can be improved in the uniformity and the durability of the bead portion.

DESCRIPTION OF EMBODIMENTS

Embodiments of the present invention will now be described in detail in conjunction with the accompanying drawings.

Figure 1:
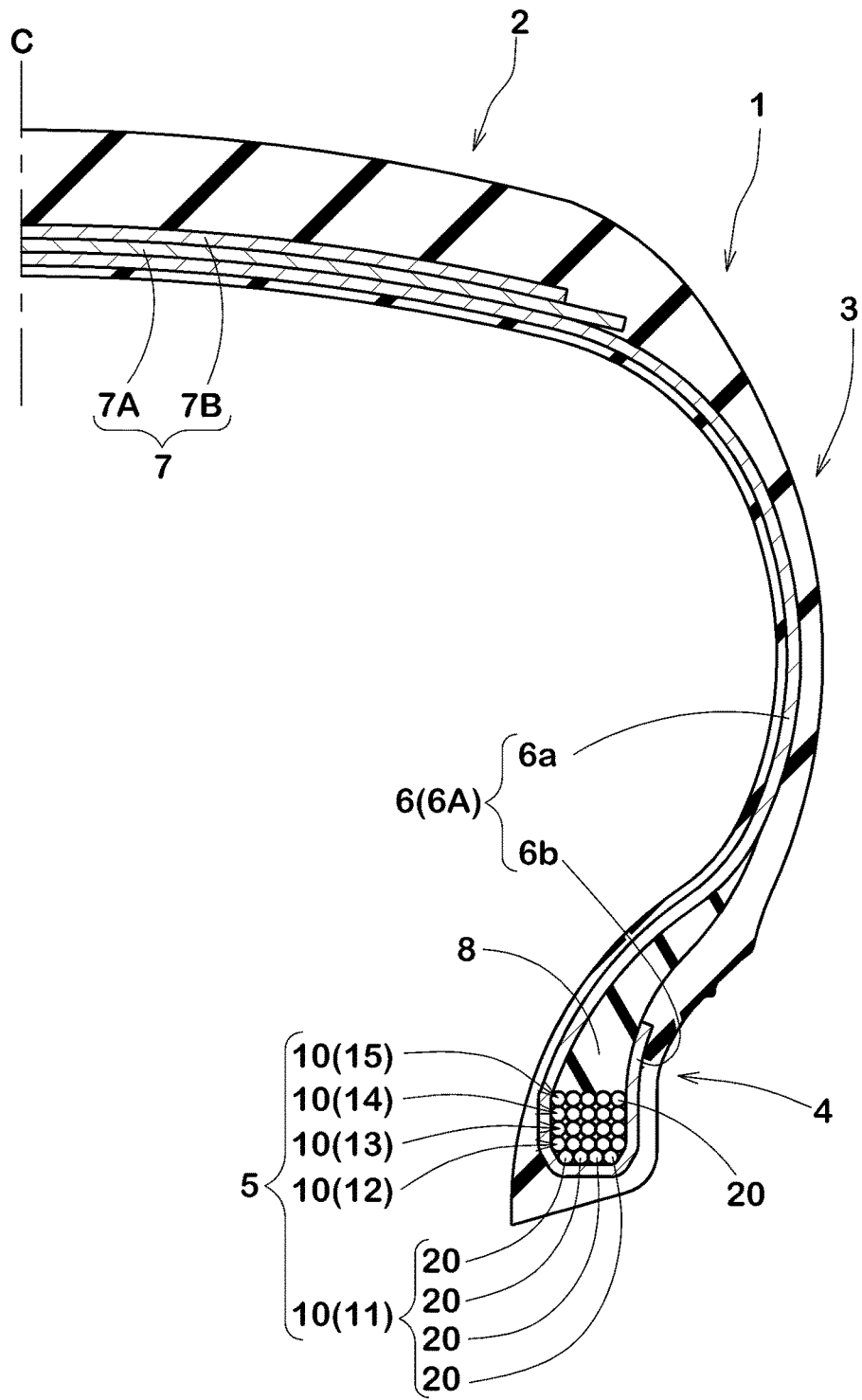
FIG. 1 is a cross sectional view showing an embodiment of the pneumatic tire according to the present invention.

FIG. 1 is a tire meridian cross sectional view including the tire rotational axis, of a pneumatic tire 1 (hereinafter, simply called "tire" depending on circumstances) in this embodiment under a normal state.

For example, the tire 1 in this embodiment is constructed for passenger cars.

The "normal state" is such a state that the tire is mounted on a standard wheel rim (not shown), inflated to a standard inner pressure, and loaded with no tire load. In this specification, dimensions of various tire portions refer to values measured under the normal state unless otherwise noted.

The "standard wheel rim" is a wheel rim specified for the tire by a standard included in a standardization system on which the tire is based, for example, the "normal wheel rim" in JATMA, "Design Rim" in TRA, and "Measuring Rim" in ETRTO.

The "standard inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 in this embodiment has a carcass 6 and a belt layer 7.

The carcass 6 extends from a tread portion 2 to a bead core 5 in a bead portion 4 through a sidewall portion 3. For example, the carcass 6 is composed of a single carcass ply 6A. For example, the carcass ply 6A includes a main portion 6a and a turned up portion 6b. For example, the main portion 6a extends from the tread portion 2 to bead core 5 through the sidewall portion 3. For example, the turned up portion 6b is continued to the main portion 6a and turned up around the bead core 5.

For example, the carcass ply 6A has carcass cords arranged so as to incline at an angle of 75 to 90 degrees with respect to the tire circumferential direction. As for the carcass cords, organic fiber cords, for example, nylon, polyester, rayon or the like are suitably used.

For example, between the main portion 6a and the turned up portion 6b, there is disposed a hard bead apex rubber 8 extending from the bead core 5 in a tapered manner. Thereby, the bead portion 4 is reinforced.

For example, the belt layer 7 is disposed in the tread portion 2 and on the radially outside of the carcass 6. The belt layer 7 in this embodiment is, for example, composed of two belt plies 7A, 7B. The belt ply 7A, 7B has belt cords arranged, for example, so as to incline at an angle of 10 to 45 degrees with respect to the tire circumferential direction. For example, the belt plies 7A, 7B are overlapped so that the belt cords of one ply cross those of the other ply.

As for the belt cords, for example, steel, aramid, rayon or the like is suitably used. Thereby, the rigidity of the tread portion 2 is effectively increased.

Figure 2:
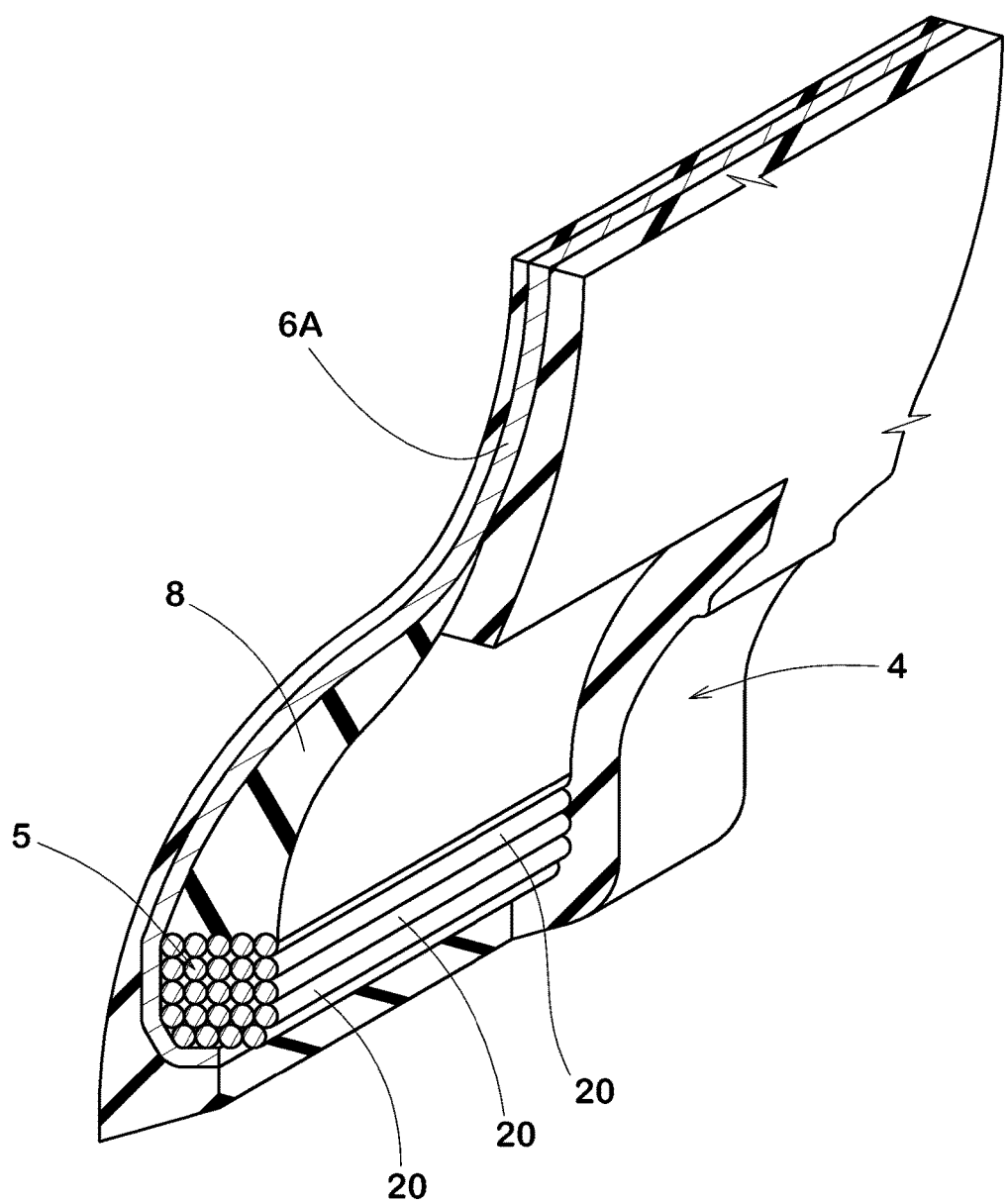
FIG. 2 is an enlarged perspective view of the bead portion in FIG. 1.

In FIG. 2, an enlarged perspective view of the bead portion 4 in FIG. 1 is shown. As shown in FIG. 2, the bead core 5 is constructed by a steel bead wire 20.

The bead core 5 has a wound single bead wire structure formed by continuously winding a single bead wire 20 around the tire rotational axis.

Figure 3:
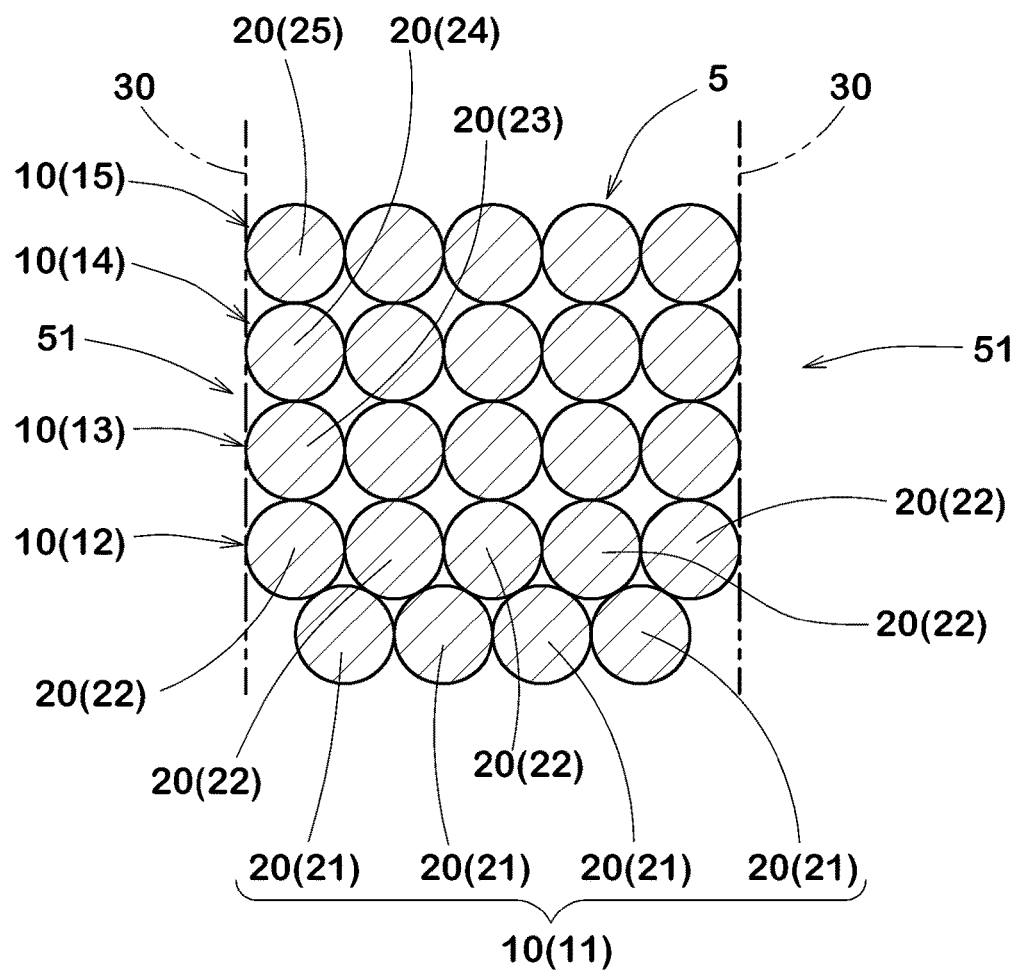
FIG. 3 is an enlarged cross sectional view of the bead core in FIG. 1.

In FIG. 3, an enlarged cross sectional view of the bead core 5 in this embodiment is shown. As shown in FIG. 3, the bead core 5 has at least three wire layers 10 in the tire radial direction, of turns of the bead wire 20 arranged side by side in the tire axial direction. In this embodiment, five wire layers 10 are provided. The bead core 5 in this embodiment is composed of a 1st wire layer 11, a 2nd wire layer 12, a 3rd wire layer 13, a 4th wire layer 14, and a 5th wire layer 15 which are overlapped in the tire radial direction in this order from the inside.

The bead core 5 has side faces 51 on both sides in the tire axial direction. The side face 51 has such a shape that it is possible to draw a common tangent 30 to at least two turns of the bead wire 20 appearing in the side face 51 which tangent is substantially parallel with the tire radial direction.

Owing to such shape of the side face, the bead core 5 is stably pinched by a jig when forming and shaping a raw tire. Further, in each side face 51 of the bead core 5, a pressing force from a jig is dispersedly imposed on a plurality of the turns of the bead wire, and possible disarrangement of the turns of the bead wire is effectively prevented. Therefore, the bead core 5 according to the present invention can improve the tire uniformity.

In addition, such shape of the side face of the bead core 5 increases the contact area with a carcass ply 6A folded at the bead core 5. Consequently, damage of the carcass ply 6A due to friction by the bead core 5 is effectively prevented.

In the bead core 5, the turns of the bead wire 21 in the 1st wire layer 11 are alternated with the turns of the bead wire 22 in the 2nd wire layer 12 so that the wire's centers of the turns are shifted from each other in the tire axial direction by a substantially wire's radius.

In this embodiment, over the substantially entire circumference, the turns of the bead wire 21 in the 1st wire layer 11 are alternated with the turns of the bead wire 22 in the 2nd wire layer 12 so that the wire's centers of the turns are shifted from each other in the tire axial direction by a substantially wire's radius.

The "substantially wire's radius" does not always mean near 50% of the diameter, and may be ranged from 35% to 65% of the wire's diameter.

Thereby, even if the bead portion is deformed during running, the 1st wire layer 11 and the 2nd wire layer 12 are prevented from being displaced since they are engaged with each other by the turns of the bead wire.

Figure 4:
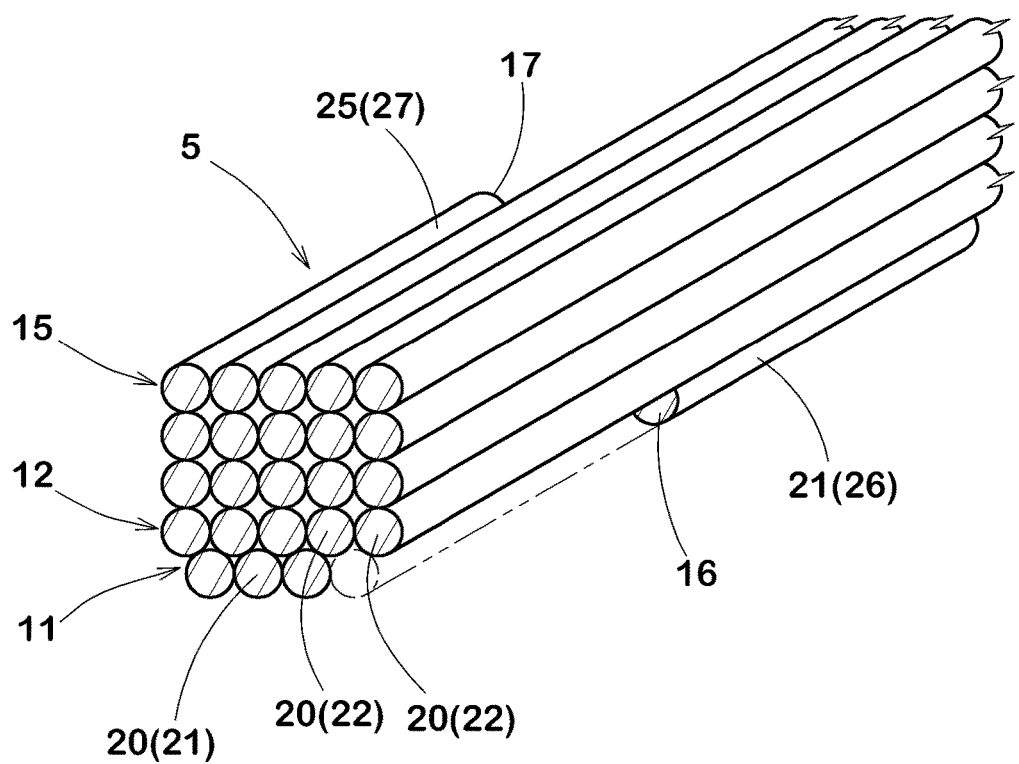
FIG. 4 is a perspective view of a part of the bead core.

In FIG. 4, a perspective view of a part of the bead core 5 is shown. As shown in FIG. 4, the bead wire 20 constituting the bead core 5 has a winding-start end 16 and a winding-stop end 17. The winding-start end 16 of the bead wire 20 is positioned in the 1st wire layer 11 and between adjacent two turns 22, 22 of the bead wire in the 2nd wire layer 12.

In such bead core 5, the position of the winding-start end 16 becomes stable, and the durability of the bead portion is well maintained.

For example, it is preferable that the winding-start end 16 in this embodiment is positioned in the most outside turn 26 in the tire axial direction in the 1st wire layer 11. Since the outer surface of the bead portion is strongly pressed against a wheel rim flange, the winding-start end 16 is firmly bounded at the above-mentioned position. Consequently, the carcass ply 6A is prevented form being damaged by the cut edge of the winding-start end 16.

If the winding-start end 16 is positioned in the axially innermost turn in the 1st wire layer 11, then there is a possibility that the cut edge of the winding-start end 16 abrades the carcass ply 6A when the bead portion is bent.

It is preferable that the winding-start end 16 and the winding-stop end 17 of the bead wire are placed at substantially same circumferential position. Thereby, the tire uniformity is further improved.

As shown in FIG. 3, in the bead core 5 in this embodiment, with respect to the 2nd wire layer 12 to the 5th wire layer 15, the respective turns of the bead wire 20 are located at substantially same axial positions. Thereby, it is possible to draw the common tangent 30 to four turns of the 2nd wire layer 12 to the 5th wire layer 15. Such bead core 5 can be more stably pinched by a jig.

FIGS. 5(*a*) and 5(*b*) each show a cross sectional view of the bead core 5 of a further embodiment of the present invention. In FIGS. 5(*a*) and 5(*b*), for a structure common to the above-mentioned embodiments, the same reference sign as used therein is used.

In the embodiment shown in FIG. 5(*a*), the turns 24 in the 4th wire layer 14, the turns 23 in the 3rd wire layer 13, and the turns 22 in the 2nd wire layer 12 are respectively disposed at substantially same axial positions.

The turns 25 in the 5th wire layer 15 and the turns 24 in the 4th wire layer 14 are alternated with the radially adjacent turns so that the wire's centers of the turns are shifted from each other in the tire axial direction by a substantially wire's radius.

The number N5 of the turns 25 of the bead wire in the 5th wire layer 15 is smaller by one (1) than the number N4 of the turns 24 of the bead wire in the 4th wire layer 14.

Each of the side faces of the bead core 5 in this embodiment has a shape such that it is possible to draw the common tangent 30 to the turns 22, 23 and 24 appearing in the side face 51, of the 2nd wire layer 12, the 3rd wire layer 13, and the 4th wire layer 14.

Such bead core 5 secures a large contact area between the side face and the carcass ply 6A. Further, since the cut edge (FIG. 4) of the winding-stop end 17 in the 5th wire layer 15 is hard to contact with the carcass ply 6A, the carcass ply 6A is effectively prevented from being damaged.

In the embodiment shown in FIG. 5(*b*), the turns of every two adjacent layers of the 1st wire layer 11 through the 5th wire layer 15 are alternated with each other so that the wire's centers of the turns are shifted from each other in the tire axial direction by a substantially wire's radius.

The number N2 of the turns 22 of the bead wire in the 2nd wire layer 12 and the number N4 of the turns 24 of the bead wire in the 4th wire layer 14 are larger by one (1) than the number N1 of the turns 21 of the bead wire in the 1st wire layer 11, the number N3 of the turns 23 of the bead wire in the 3rd wire layer 13 and the number N5 of the turns 25 of the bead wire in the 5th wire layer 15. Namely, N2=N4=N1+1 and N1=N3=N5. Each of the side faces of the bead core 5 in this embodiment has a shape such that it is possible to draw the common tangent 30 to the turns of the bead wire 20 in the 2nd wire layer 12 and the 4th wire layer 14.

Such bead core 5 is prevented from being deformed during running since the turns of the bead wire 20 are engaged with each other. Consequently, the steering stability and the durability of the bead portion are further improved.

FIGS. 6(*a*) and 6(*b*) each show a cross sectional view of the bead core of a further embodiment of the present invention. In FIG. 6(*a*) and FIG. 6(*b*), for a structure common to the above-mentioned embodiments, the same reference sign as used therein is used.

In the embodiment shown in FIG. 6(*a*), the turns of every two adjacent layers of the 1st wire layer 11 through the 3rd wire layer 13 are alternated with each other so that the wire's centers of the turns are shifted from each other in the tire axial direction by a substantially wire's radius.

Also the turns of the 4th wire layer 14 and the 5th wire layer 15 are alternated with each other so that the wire's centers of the turns are shifted from each other in the tire axial direction by a substantially wire's radius.

But, the turns of the 3rd wire layer 13 and the 4th wire layer 14 are respectively disposed at substantially same axial positions.

In this embodiment, the number N2 of the turns 22 of the bead wire in the 2nd wire layer 12 and the number N5 of the turns 25 of the bead wire in the 5th wire layer 15 are larger by one (1) than the number N1 of the turns 21 of the bead wire in the 1st wire layer 11, the number N3 of the turns 23 of the bead wire in in the 3rd wire layer 13, and the number N4 of the turns 24 of the bead wire in the 4th wire layer 14. Namely, N2=N5=N1+1 and N1=N3=N4.

In the bead core 5 in this embodiment, it is possible to draw the common tangent 30 to the turns of the bead wire 20 in the 2nd wire layer 12 and the 5th wire layer 15.

The bead core 5 in this embodiment has a concave portion 18 in each side face 51. Such concave portions 18 are helpful to hold the bead core 5 with a jig when forming and shaping a raw tire. Accordingly, the tire uniformity is further improved.

Figure 6A:
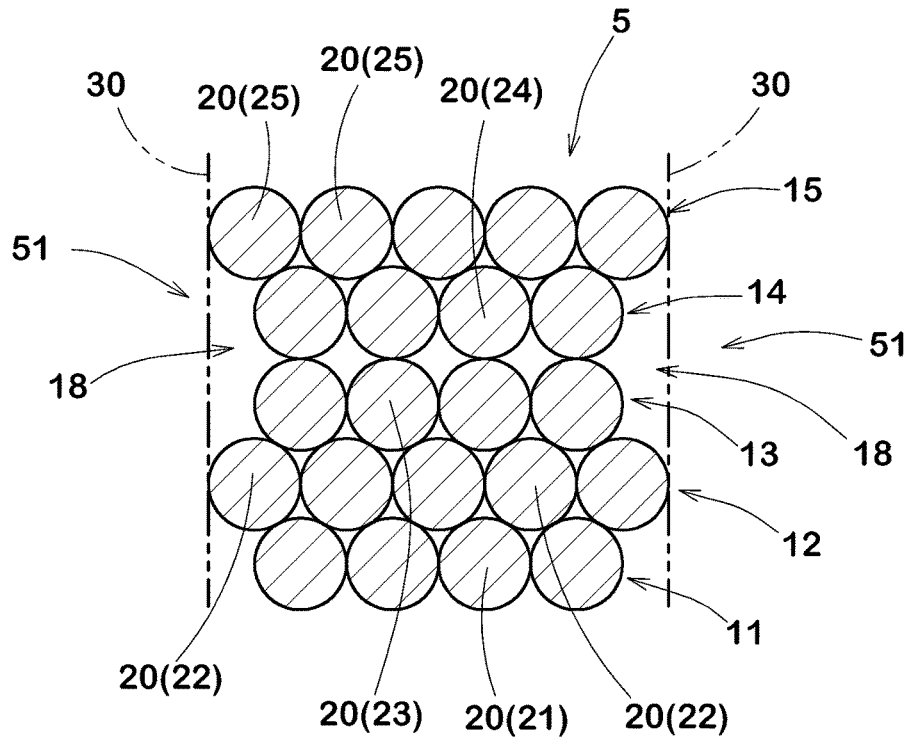
FIG. 6(a) is an enlarged cross sectional view of the bead core of another embodiment of the present invention.
Figure 6B:
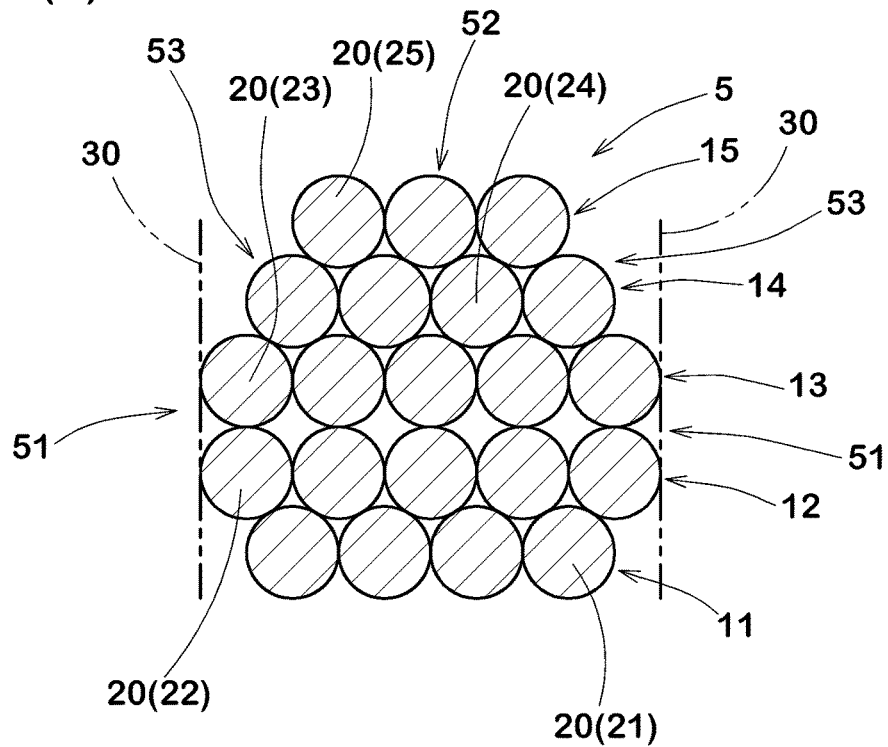
FIG. 6(b) is an enlarged cross sectional view of the bead core of another embodiment of the present invention.

In the embodiment shown in FIG. 6(b), the turns of every two adjacent layers of the 3rd wire layer 13 through the 5th wire layer 15 are alternated with each other so that the wire's centers of the turns are shifted from each other in the tire axial direction by a substantially wire's radius.

The number N4 of the turns 24 of the bead wire in the 4th wire layer 14 is smaller by one (1) than the number N3 of the turns 23 of the bead wire in the 3rd wire layer 13.

The number N5 of the turns 25 of the bead wire in the 5th wire layer 15 is smaller by one (1) than the number. N4 of the turns 24 of the bead wire in the 4th wire layer 14.

In this embodiment, the turns of the 2nd wire layer 12 and the 3rd wire layer 13 are respectively disposed at substantially same axial positions.

In the bead core 5 in this embodiment, it is possible to draw the common tangent 30 to the turns of the bead wire 20 in the 2nd wire layer 12 and the 3rd wire layer 13.

In such bead core 5, it becomes possible to increase the area of a corner portion 53 between each side face 51 and the radially outer surface 52. Accordingly, for example, even if the bead apex rubber 8 is bent easily in the tire axial direction, a contact area between the carcass ply 6A and the bead core 5 is secured, and the carcass ply 6A is prevented from being damaged. Therefore, such bead core 5 can satisfy both of the ride comfort and the durability of the bead portion.

While description has been made of particularly preferable embodiments of the present invention, the illustrated embodiments should not be construed as to limit the scope of the present invention; various modifications are possible without departing from the scope of the present invention.

EMBODIMENTS

Pneumatic tires of size 255/40R17 having the basic structure shown in FIG. 1 and specifications listed in Table 1 were experimentally manufactured.

Figure 7A:
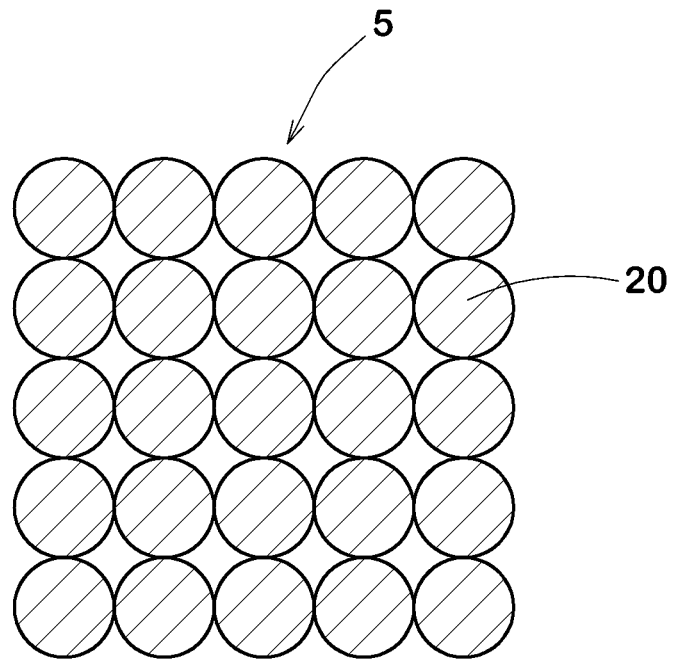
FIG. 7(a) is an enlarged cross sectional view of the bead core of a comparative example.
Figure 7B:
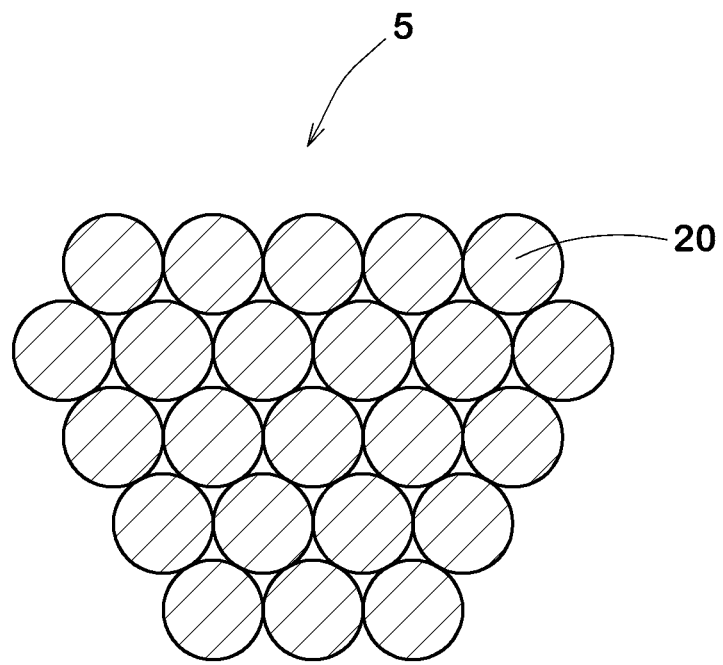
FIG. 7(b) is an enlarged cross sectional view of the bead core of a comparative example.

As comparative examples 1 and 2, tires having bead cores shown in FIGS. 7(a) and 7(b) were experimentally manufactured. Each of the test tires was tested for the durability of the bead portion and uniformity.

The test methods are as follows.

<Durability of Bead Portion>

Each test tire was filled with water and measured for the water pressure when the bead portion was destroyed. The results are indicated by an index based on comparative example 1 being 100, wherein the larger the value, the better the durability of the bead portion.

<Uniformity>

According to JASO C607:2000 "Test Procedures for Automobile Tire uniformity", each test tire was measured for RFV by the use of a uniformity machine. The results are indicated by an index based on comparative example 1 being 100, wherein the smaller value means the smaller RFV, namely, the better tire uniformity.

TABLE 1

Figure 5A:
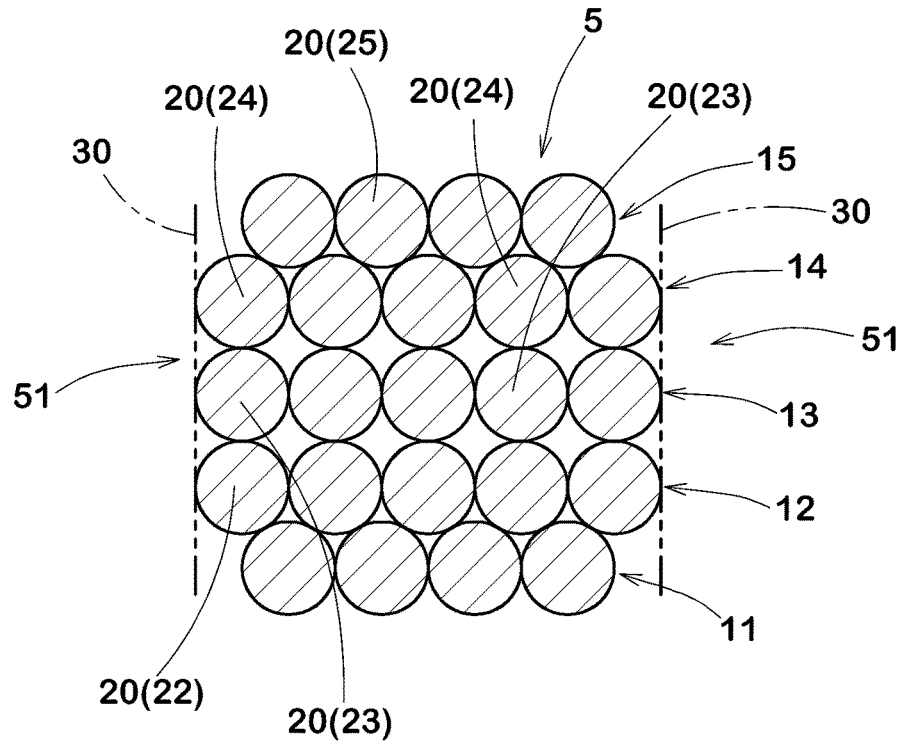
FIG. 5(a) is an enlarged cross sectional view of the bead core of another embodiment of the present invention.
Figure 5B:
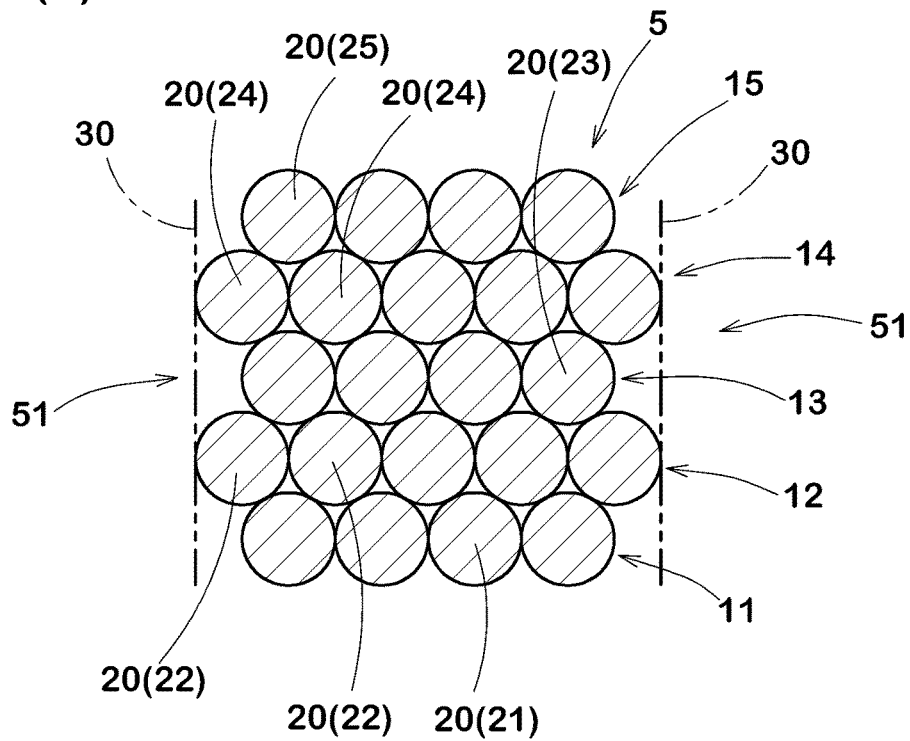
FIG. 5(b) is an enlarged cross sectional view of the bead core of another embodiment of the present invention.

|  | comparative example 1 | comparative example 2 | embodiment 1 | embodiment 2 | embodiment 3 | embodiment 4 | embodiment 5 |
| --- | --- | --- | --- | --- | --- | --- | --- |
| cross sectional view of bead core | FIG. 7(a) | FIG. 7(b) | FIG. 3 | FIG. 5(a) | FIG. 5(b) | FIG. 6(a) | FIG. 6(b) |
| number N1 of turns of bead wire of 1st wire layer | 5 | 3 | 4 | 4 | 4 | 4 | 4 |
| number N2 of turns of bead wire of 2nd wire layer | 5 | 4 | 5 | 5 | 5 | 5 | 5 |
| number N3 of turns of bead wire of 3rd wire layer | 5 | 5 | 5 | 5 | 4 | 4 | 5 |
| number N4 of turns of bead wire of 4th wire layer | 5 | 6 | 5 | 5 | 5 | 4 | 4 |
| number N5 of turns of bead wire of 5th wire layer | 5 | 5 | 5 | 4 | 4 | 5 | 3 |
| total number of turns | 25 | 23 | 24 | 23 | 22 | 22 | 21 |
| durability of bead portion (index) | 100 | 109 | 110 | 109 | 108 | 108 | 107 |
| uniformity (index) | 100 | 121 | 85 | 81 | 95 | 96 | 76 |

From the results of the tests, it was confirmed that the pneumatic tires of the embodiments were improved in the durability of the bead portion and the uniformity.

REFERENCE SIGNS LIST 4 bead portion
5 bead core
10 wire layer
11 1st wire layer
12 2nd wire layer
16 winding-start end
17 winding-stop end
20 singe bead wire
21 turn of bead wire in 1st wire layer 22 turn of bead wire in 2nd wire layer
30 common tangent
51 side face

The invention claimed is:

1. A pneumatic tire comprising
a bead portion provided with a bead core formed of a steel bead wire, wherein
the bead core has a wound single bead wire structure formed by continuously winding the single bead wire around the tire rotational axis to have a winding-start end and a winding-stop end,
in a tire meridian section including the tire rotational axis, the wound single bead wire structure has five layers in the tire radial direction, of turns of the bead wire which are arranged side by side in the tire axial direction, and each side face of the bead core has a shape such that it is possible to draw a common tangent to at least two turns of the bead wire appearing in the side face which tangent is substantially parallel with the tire radial direction,
turns of the bead wire in the radially innermost 1st wire layer are alternated with turns of the bead wire in the 2nd wire layer disposed radially outside of the 1st wire layer so that the wire centers of the turns are shifted from each other in the tire axial direction by substantially the wire radius,
one of the turns in the 1st wire layer has the winding-start end of the bead wire, and the winding-start end is positioned between adjacent two turns of the bead wire in the 2nd wire layer,
wherein
the $3^{rd}$ wire layer is disposed radially outside of the $2^{nd}$ wire layer,
the $4^{th}$ wire layer is disposed radially outside of the $3^{rd}$ wire layer, and
the $5^{th}$ wire layer is disposed radially outside of the $4^{th}$ wire layer,
wherein
the number of turns of the bead wire in the $5^{th}$ wire layer, the number of turns of the bead wire in the $4^{th}$ wire layer, the number of turns of the bead wire in the $3^{rd}$ wire layer, and
the number of the turns of the bead wire in the $2^{nd}$ wire layer are all larger by one than the number of the turns of the bead wire in the $1^{st}$ wire layer, and
wherein
the respective turns of the bead wire in the $5^{th}$ wire layer, the respective turns of the bead wire in the $4^{th}$ wire layer, the respective turns of the bead wire in the $3^{rd}$ wire layer, and
the respective turns of the bead wire in the $2^{nd}$ wire layer have substantially the same axial positions.

2. The pneumatic tire according to claim 1, wherein the axially outermost turn in the 1st wire layer has the winding-start end.

3. A pneumatic tire comprising
a bead portion provided with a bead core formed of a steel bead wire,
wherein
the bead core has a wound single bead wire structure formed by continuously winding the single bead wire around the tire rotational axis to have a winding-start end and a winding-stop end,
in a tire meridian section including the tire rotational axis, the wound single bead wire structure has five layers in the tire radial direction, of turns of the bead wire which are arranged side by side in the tire axial direction, and each side face of the bead core has a shape such that it is possible to draw a common tangent to at least two turns of the bead wire appearing in the side face which tangent is substantially parallel with the tire radial direction,
turns of the bead wire in the radially innermost 1st wire layer are alternated with turns of the bead wire in the 2nd wire layer disposed radially outside of the 1st wire layer so that the wire centers of the turns are shifted from each other in the tire axial direction by substantially the wire radius,
one of the turns in the 1st wire layer has the winding-start end of the bead wire, and the winding-start end is positioned between adjacent two turns of the bead wire in the 2nd wire layer,
wherein
the 3rd wire layer is disposed radially outside of the 2nd wire layer,
the 4th wire layer is disposed radially outside of the 3rd wire layer, and
the 5th wire layer is disposed radially outside of the 4th wire layer,
wherein
the number of turns of the bead wire in the 5th wire layer is larger by one than the number of turns of the bead wire in the 4th wire layer,
the number of the turns of the bead wire in the 4th wire layer is the same as the number of turns of the bead wire in the 3rd wire layer,
the number of the turns of the bead wire in the 3rd wire layer is smaller by one than the number of the turns of the bead wire in the 2nd wire layer, and
the number of the turns of the bead wire in the 2nd wire layer is larger by one than the number of the turns of the bead wire in the 1st wire layer, and
wherein
the respective turns of the bead wire in the 5th wire layer are alternated with the respective turns of the bead wire in the 4th wire layer,
the respective turns of the bead wire in the 4th wire layer and the respective turns of the bead wire in the 3rd wire layer have substantially the same axial positions, and
the respective turns of the bead wire in the 3rd wire layer are alternated with the respective turns of the bead wire in the 2nd wire layer.

4. The pneumatic tire according to claim 3, wherein the axially outermost turn in the 1st wire layer has the winding-start end.

5. A pneumatic tire comprising
a bead portion provided with a bead core formed of a steel bead wire,
wherein
the bead core has a wound single bead wire structure formed by continuously winding the single bead wire around the tire rotational axis to have a winding-start end and a winding-stop end,
in a tire meridian section including the tire rotational axis, the wound single bead wire structure has five layers in the tire radial direction, of turns of the bead wire which are arranged side by side in the tire axial direction, and each side face of the bead core has a shape such that it is possible to draw a common tangent to at least two turns of the bead wire appearing in the side face which tangent is substantially parallel with the tire radial direction,
turns of the bead wire in the radially innermost 1st wire layer are alternated with turns of the bead wire in the 2nd wire layer disposed radially outside of the 1st wire layer so that the wire centers of the turns are shifted from each other in the tire axial direction by substantially the wire radius, one of the turns in the 1st wire layer has the winding-start end of the bead wire, and the winding-start end is positioned between adjacent two turns of the bead wire in the 2nd wire layer, wherein the 3rd wire layer is disposed on the radially outside of the 2nd wire layer, the 4th wire layer is disposed on the radially outside of the 3rd wire layer, and the 5th wire layer is disposed on the radially outside of the 4th wire layer, wherein the number of turns of the bead wire in the 5th wire layer is smaller by one than the number of turns of the bead wire in the 4th wire layer, the number of the turns of the bead wire in the 4th wire layer is smaller by one than the number of turns of the bead wire in the 3rd wire layer, the number of the turns of the bead wire in the 3rd wire layer is the same as the number of the turns of the bead wire in the 2nd wire layer, and the number of the turns of the bead wire in the 2nd wire layer is larger by one than the number of the turns of the bead wire in the 1st wire layer, and wherein the respective turns of the bead wire in the 5th wire layer are alternated with the respective turns of the bead wire in the 4th wire layer, the respective turns of the bead wire in the 4th wire layer are alternated with the respective turns of the bead wire in the 3rd wire layer, and the respective turns of the bead wire in the 3rd wire layer and the respective turns of the bead wire in the 2nd wire layer have substantially the same axial positions.

\* \* \* \* \*